United States Patent [19]

Van Winkle

[11] 4,123,063
[45] Oct. 31, 1978

[54] REPLAY AND PROTECTIVE DISC FOR PHONOGRAPH RECORD CHANGERS

[76] Inventor: Martin J. Van Winkle, 338 Marlborough St., Boston, Mass. 02115

[21] Appl. No.: 757,090

[22] Filed: Jan. 5, 1977

[51] Int. Cl.² .................................................. G11B 3/62
[52] U.S. Cl. ................................... 274/1 R; 274/42 R
[58] Field of Search ............................ 274/1 R, 42 R

[56] References Cited
U.S. PATENT DOCUMENTS

| 832,403 | 10/1906 | Milans | 274/42 R |
|---|---|---|---|
| 870,961 | 11/1907 | Hoffman | 274/42 R |
| 1,930,502 | 10/1933 | Barton | 274/42 R |
| 2,906,536 | 9/1959 | Mauerhoff | 274/1 R |
| 3,401,943 | 9/1968 | O'Brien | 274/1 R |

Primary Examiner—Richard C. Aegerter
Assistant Examiner—John W. Shepperd
Attorney, Agent, or Firm—John M. Brandt

[57] ABSTRACT

A disc used for the replay and protection of phonograph records on an automatic changer is disclosed which disc has a center hole and a keyway extending therefrom allowing the disc to slide down the changer spindle when the keyway is aligned with the spindle record release lever or to remain atop the spindle when the keyway is misaligned with the release lever.

2 Claims, 6 Drawing Figures

REPLAY AND PROTECTIVE DISC FOR PHONOGRAPH RECORD CHANGERS

BACKGROUND OF THE INVENTION

1. Field of the Invention

The invention resides in the field of phonograph record accessories, and more particularly relates to devices for replaying and protecting phonograph records on an automatic record changer.

2. Description of the Prior Art

The concept of a prtoective disc to separate phonograph records played on an automatic record changer has been disclosed in the prior art. Additionally, a method for replaying a record using a disc as a record substitute is also to be found in the prior art.

U.S. Pat. No. 2,906,536, Mauerhoff, reveals a very thin deformable disc with an outer annular cushion. In use, the weight of the record stack presses the thin center of the disc in close contact with a record atop it so that the release mechanism allows both disc and record to pass during each change cycle. The thicker cushion portion protects the record from other records atop it.

U.S. Pat. No. 3,401,943, O'Brian, discloses a method for operating an automatic phonograph in which a small diameter disc of record thickness is used as a substitute record to drop on to the turntable and cause the replay of the record directly below it. Alternatively, as revealed in the same patent, a disc of greater than record thickness is used to block the spindle release lever and continuously replay the record already on the turntable. The device disclosed herein presents an improvement in the art as defined by the above described patents.

SUMMARY OF THE INVENTION

The invention comprises a disc of material, plastic for example, of a thickness equal to or greater than the records to be played on the automatic changer that the disc is intended to be used with. In practice, records are of a standard thickness and changers of a design to accept the standard thickness. The disc has a center hole to receive the changer spindle and a keyway extending outward from the center hole which is large enough to fit over the spindle record release lever.

The disc is sufficiently thick such that misalignment of the keyway with the release lever will cause the disc to remain atop the spindle by the same principle of operation that allows only a single record to drop during each change cycle. This will cause the record already on the turntable to be replayed as the changer cycles, while the disc remains on the spindle for one or more cycles depending on the thickness of the disc.

Aligning the keyway with with record release lever allows the disc to drop on to the turntable atop the record below it and act as a cushion between that record and the next record to drop during the change cycle. The diameter of the disc is preferably less than that of a record label so as not to interfere with the complete playing of a record. The edges of the center hole and keyway are preferably rounded to insure that the disc slips easily over and down the spindle without binding.

The disc may either be entirely the same thickness as a record, the thickness of a record in the center and of greater thickness of the periphery, or entirely of a thickness substantially greater than a record.

These features will be more clearly understood from the drawings and the description of the preferred emobdiment which follow.

DESCRIPTION OF THE PREFERRED EMBODIMENT

Figure 1:
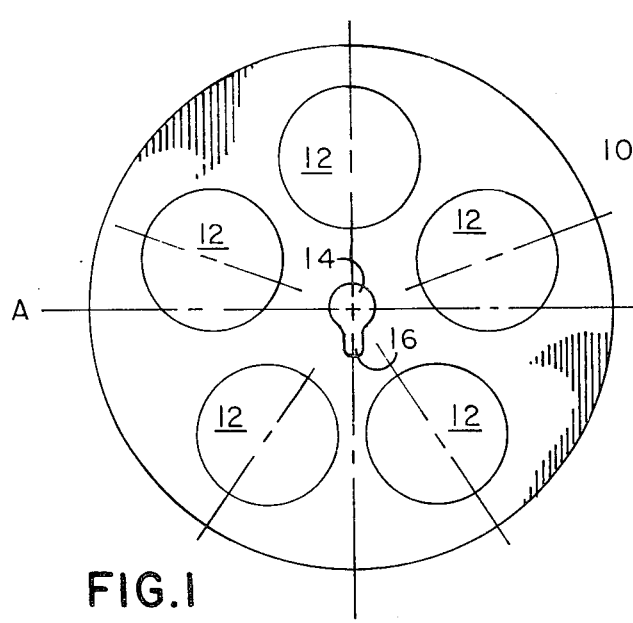
FIG. 1 is a plan view of the preferred embodiment of the invention.
Figures 2, 3:
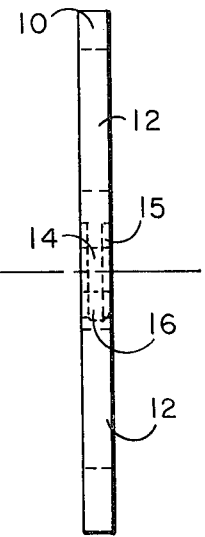
FIG. 2 is a cross sectional view of FIG. 1 along line A—A.
FIG. 3 is a cross sectional view of an alternative construction of the embodiment shown in FIG. 1.

Referring first to FIG. 1, there is shown a plan view of the disc 10 which comprises the invention. Preforations 12 are placed around the periphery of center hole 14 to reduce the amount of material, preferably plastic, needed to construct the device. Keyway 16 extends outward from hole 14 and is of a size large enough to fit over an automatic changer spindle record release lever. FIG. 2 is a cross section view of FIG. 1 which further illustrates the invention. FIG. 3 is an additional cross sectional view showing the central portion 15 of the disc as recessed as an alternative embodiment. The recessed portion is approximately equal to the thickness of a record.

Figure 4:
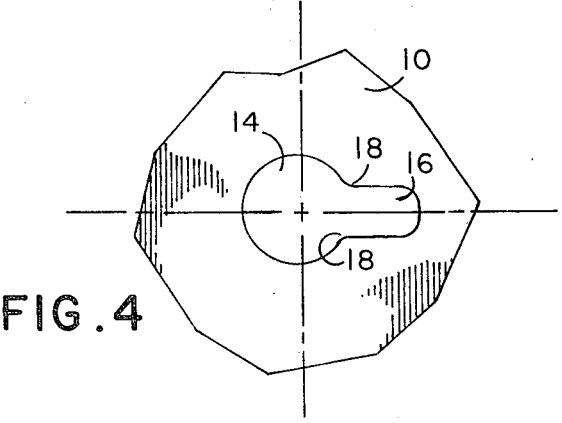
FIG. 4 is an enlarged view of a portion of FIG. 1.

FIG. 4 is an enlarged view of the central portion of FIG. 1 showing the center hole 14 and keyway 16 rounded slightly at points 18 where the two meet.

Figure 5:
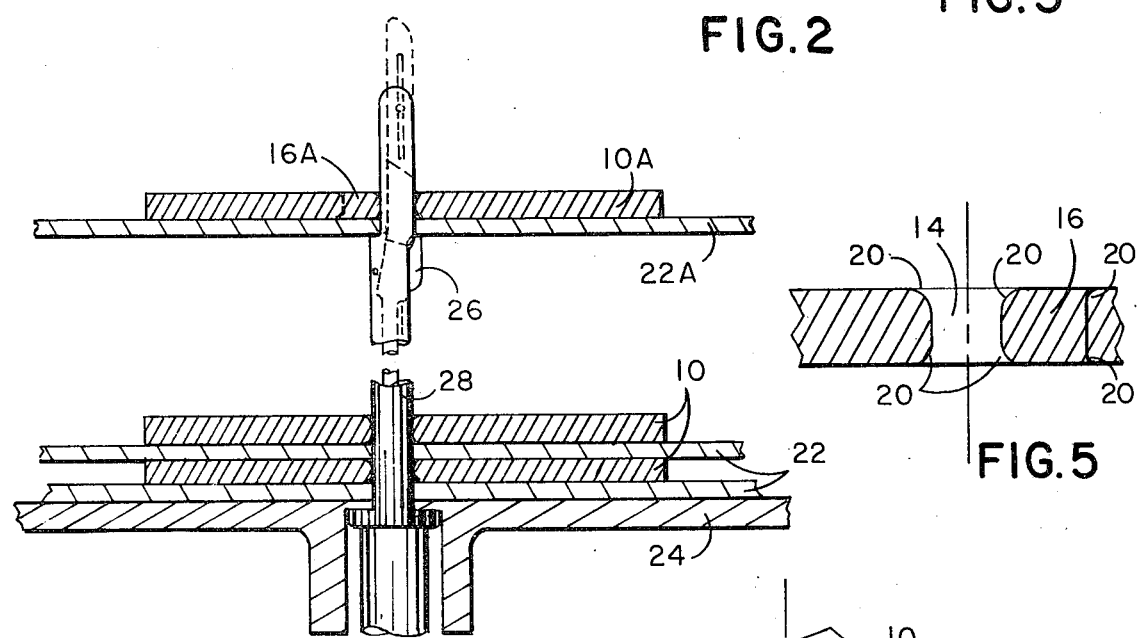
FIG. 5 is an enlarged view of a portion of FIG. 2.

FIG. 5 is an enlarged view of the central portion of FIG. 2 showing the upper and lower edges of the center hole rounded at point 20. Rounding these points and edges facilitates the movement of the disc over the spindle.

Figure 6:
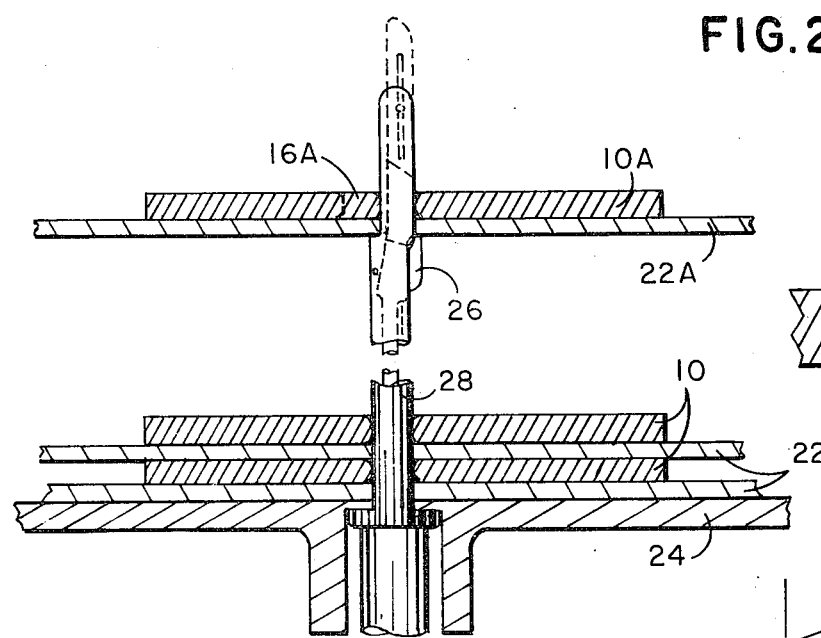
FIG. 6 is a cross sectional view of apparatus showing the invention in use.

FIG. 6 illustrates the use of the invention. Records 22 are shown stacked on turntable 24 of an automatic record changer. Discs 10 shown thicker than the records, are positioned between them acting as cushions. The keyways of discs 10 are aligned below record release lever 26 of spindle 28 indicating the manner in which the discs are arranged to drop onto the table atop the respective records.

Record 22A remains atop the spindle above which is disc 10A with its keyway 16A rotated away from the release lever. This disc will not drop with record 22A during the next change cycle but will remain on the spindle to continuously replay the last record, since the disc is thicker than that which can be passed by the record release lever during the change cycle. Alternatively, the embodiment of FIG. 2 may be used to replay record 22 only once since the central portion of that construction is approximately the thickness of a record which will result in the disc acting as a substitute record dropping on to the turntable after a single cycle.

Having described the concept of the device, the scope of the invention is defined by the following claims.

What is claimed is:

1. An accessory device for replaying and protecting phonograph records on automatic changers having a spindle and spindle record release lever, said device comprising:

a disc having a center hole and a keyway slot extending from said center hole, said keyway slot of sufficient size to slip over said release lever and wherein the thickness of the central portion of said disc is less than the periphery of said disc;

the central portion of said disc is of a thickness at least about equal to the thickness of records to be played on the automatic changer; and the diameter of said disc is no greater than the diameter of the labels of the records to be played on the automatic changer whereby during a single change cycle when the keyway is aligned with the release lever, the disc slides down the changer spindle with the underlying record and when the keyway is misaligned with the release lever, the disc remains atop the spindle.

2. The apparatus of claim 1 wherein the interface points of said center hole and said keyway are rounded.

* * * * *